United States Patent [19]

Williams et al.

[11] Patent Number: 4,950,635
[45] Date of Patent: Aug. 21, 1990

[54] METHOD FOR PRODUCING DUAL ZONE MATERIALS BY CATALYZED HALOSILYLATION

[75] Inventors: Dwight E. Williams; Thomas J. Tangney, both of Midland, Mich.

[73] Assignee: Dow Corning Corporation, Midland, Mich.

[21] Appl. No.: 248,737

[22] Filed: Sep. 22, 1988

Related U.S. Application Data

[63] Continuation-in-part of Ser. No. 154,754, Feb. 11, 1988.

[51] Int. Cl.$^5$ .................. B01J 20/32; B01J 20/22; B01D 15/08; B32B 5/14
[52] U.S. Cl. ..................... 502/401; 55/386; 210/198.2; 210/198.3; 210/656; 427/387; 428/405
[58] Field of Search ................. 502/401–404, 502/5, 150, 158, 159; 55/386; 210/198.2, 198.3, 656; 252/184; 427/54.1, 387; 428/405

[56] References Cited

U.S. PATENT DOCUMENTS

| | | |
|---|---|---|
| 3,207,699 | 9/1965 | Harding et al. |
| 3,839,395 | 10/1974 | Otsuka . |
| 3,960,720 | 6/1976 | Porath . |
| 3,984,349 | 10/1976 | Meiller et al. |
| 4,061,503 | 12/1977 | Berger et al. |
| 4,062,693 | 12/1977 | Berger . |
| 4,105,465 | 8/1978 | Berger . |
| 4,233,366 | 11/1980 | Sample, Jr., et al. |
| 4,298,850 | 11/1981 | Abbott . |
| 4,324,689 | 4/1982 | Shah . |
| 4,379,931 | 4/1983 | Plueddemann . |
| 4,539,399 | 9/1985 | Armstrong . |
| 4,540,486 | 9/1985 | Ramsden . |
| 4,544,485 | 10/1985 | Pinkerton . |
| 4,624,932 | 11/1986 | Bogoch . |
| 4,675,384 | 6/1987 | Dromard et al. |
| 4,696,745 | 9/1987 | Itagaki et al. |
| 4,778,600 | 10/1988 | Williams .................. 210/198.2 |
| 4,782,040 | 11/1988 | Revis et al. ............... 502/401 |

OTHER PUBLICATIONS

Boksanyi et al., *Advances in Coll. and Int. Sci.*, vol. 6 (1976) pp. 95–132.
Chang, "High Speed Ion Exchange Chromatography of Proteins", *Anal. Chem.*, vol. 48, No. 13, Nov. 1976, p. 1839–45.
Chmielowiec et al., *J. of Coll. and Int. Sci.*, vol. 94, No. 2, Aug. 1983.
Hagestam et al., "Internal Surface Reversed–Phase Silica Supports for Liquid Chromatography", *Analytical Chem.*, vol. 57, 1985, pp. 1757t.
Hagestam et al., "Internal Surface Reversed–Phase Silica Support Prepared with Chymotrypsin", *Journal of Chem.*, vol. 351, 1986, pp. 239–248.
Hertl et al., *J. Phy. Chem.*, vol. 75, No. 14, 1971.
Hunnicutt et al., "Reactivity of Organosilane Reagents on Microparticulate Silica", *Anal. Chem.*, vol. 58, 1986, pp. 748, 752.
Marshall et al., "Synthesis of LC Reversed Phases of Higher Efficiency by Initial Partial Deactivation of Silica Surface", *Journal of Chrom. Sci.*, vol. 22, Jun. 1984, pp. 217–220.
Poole, C. F. Recent Advances in Silylation of Organic Compounds for GAS Chromatography, Chap. 4, King, Heyden, London, 1977, pp. 152–200.
Snyder et al., *Intro to Modern Liq. Chrom.* 2nd ed. Wiley Interscience, N. Y. 1979.
Szczerba et al., "HPLC Column Finds Drugs in Serum", *Research & Dev.* Sep. 1986, pp. 84–86.
Williams et al., Silica, Surfaces to Interfaces, D. E. Leyden et al., Gordon to Brench Publishers, 1986, p. 471ff.

*Primary Examiner*—Paul E. Konopka
*Attorney, Agent, or Firm*—Killworth, Gottman, Hagan & Schaeff

[57] ABSTRACT

Dual zone porous materials having an external zone and an internal zone are prepared by contacting a suspension of a porous support, such as particulate silica, in a solvent with a halosilane and a catalyst for the halosilane in order to form first silyl groups predominantly on the external surfaces of the porous support. Preferably thereafter the porous support is contacted with a silane having second silyl groups in order to a form second silyl groups predominantly on the internal surfaces.

34 Claims, No Drawings

METHOD FOR PRODUCING DUAL ZONE MATERIALS BY CATALYZED HALOSILYLATION

CROSS-REFERENCE TO RELATED APPLICATIONS

This is a continuation-in-part of application Ser. No. 154,754, filed Feb. 11, 1988, the disclosure of which is hereby incorporated by references. Reference is also made to copending applications Ser. No. 598,120, filed Apr. 9, 1984, now U.S. Pat. No. 4,782,040 issued Nov. 1, 1988, and Ser. No. 063,576, filed June 17, 1987, now U.S. Pat. No. 4,778,600, issued Oct. 18, 1988 and assigned to the same assignee as the present invention.

BACKGROUND OF THE INVENTION

The present invention relates to a method for producing dual zone porous materials having an external zone bearing first silyl groups immobilized on the external surfaces of the porous material and internal zone having second silyl groups immobilized on the internal surfaces of the porous material and the dual zone materials so produced. More particularly, it relates to a method for catalyzed halosilylation of predominantly the external surfaces of a porous hydroxyl-bearing support and production of a dual zone material.

In copending application Ser. Nos. 154,754, and 598,120, there are disclosed dual surface (more properly termed dual zone) porous materials made by treating a porous hydroxyl-bearing support, such as porous silica, alumina, zirconia, etc., with substoichiometric amounts of an ultrafast silylating agent. This agent is chosen from those which are so reactive that the resulting surface group is immobilized in the external zone of the porous support before the agent has had time to migrate deeply into the porous internal zone. A subsequent silylation reaction can be employed to convert residual hydroxyl groups, which reside predominantly in the internal zone, to a second immobilized group of another type. See also, Williams & Tangney, *Silanes, Surfaces & Interfaces*, D. E. Leyden, ed., Gordon & Breach Publisher, 1986, P. 471 ff.

In copending application Ser. No. 598,120, the disclosed ultrafast silylating agents are reactive silane intermediates. In patent application Ser. No. 154,754 the ultrafast silylating agents are silanes having "leaving groups" such as (i) substituted amides, (ii) substituted amines, or (iii) thiothers. It is believed that these facile leaving groups lower the activation energy required for reaction with surface hydroxyl groups and thus enhance the extent to which the silane can be captured by covalent bond formation in the external zone of the porous material, that is, captured early during its diffusion path into said material.

As stated in copending application Ser. Nos. 154,754, and 598,120, traditional silylation reactions are generally not fast enough to permit preferential silylation of the external surface of the porous support. "Traditional silylation" is described in Plueddemann, *Encyclopedia of Chemical Technology*, 3rd ed., Vol. 20, page 962 et seq. Plueddemann states that silylation is the displacement of active hydrogen from an organic molecule by silyl groups where "The active hydrogen is usually OH, NH, or SH, and the silylating agent is usually a trimethylsilyl halide or a nitrogen-functional compound. A mixture of silylating agent is usually a trimethylsilyl halide or a nitrogen-functional compound. A mixture of silylating agents may be used; a mixture of trimethychlorosilane and hexamethyldisilazane is more reactive than either reagent alone, and the by-products combine to form neutral ammonium chloride."

Halosilanes, in particular, have been tried, but have been found to be insufficient to produce dual zone porous material. For example, M. L. Hunnicutt and J. M. Harris in "Reactivity of Organosilane Reagents on Microparticulate Silica." *Anal. Chem.*, vol. 58, 1986, pp. 748–752 discuss the use of halosilanes in an attempt to demonstrate pore diffusion control of silica silylation. Hunnicutt and Harris discuss the results of competitive surface reactions between binary organosilane mixtures and silica gel. The organosilane mixtures used include mixtures of two haloalkylsilanes such as (1-bromomethyl)dimethylmonochlorosilane, (1-chloromethyl)dimethylmonochlorosilane, or (3-chloropropyl)dimethylmonochlorosilane, as well as mixtures of a haloalkysilane with an alkylsilane such as trimethylchlorosilane (TMCS) or hexamethyldisilazane (HMDS). In a number of instances a catalyst such as pyridine was added to the silica slurry prior to silane addition for base catalyzed reactions. Hunnicutt and Harris showed that their reaction did not display pore diffusion control. Thus they could not have produced dual zone materials (DZMs) with respect to differential distribution of their chosen immobilized groups. This outcome is believed to be due to several factors. Most importantly, mixtures of chlorosilanes of the type used by Hunnicutt and Harris do not react with sufficient speed and differentiality even when the reaction is catalyzed with pyridine.

Furthermore, the reaction conditions were not adjusted so as to produce DZMs even from the point of view of selective capture of both chlorosilanes together in the external zone. Firstly, the solvent they used was chloroform which is highly polar and is known to be a proton donor in hydrogen-bonded complexes. Such solvents have been found to reduce pore diffusion control, probably by sequestering the surface reactive sites (silanol) and thus slowing down the reaction rate. Protic solvents such as ethanol are even more deleterious since the halosilane is solvolyzed and transformed into the less reactive ethoxysilane. Secondly, Hunnicutt and Harris used excessive amounts of silane averaging 36 molecules/$nM^2$ of silica surface, which would saturate the silica and thus afford a uniformly saturated surface treatment rather than a dual zone structure. Thirdly, the rate of silane addition to the silica slurry was excessively fast at about 0.3 molecules/$nM^2$/minute. Accordingly, individual silica particles would be subjected to unusual doses of silane and the resultant particle-to-particle heterogeneity would overcome any intraparticle inhomogeneity (dual zone structure) that might otherwise occur. Accordingly, been though Hunnicutt and Harris conducted what could be described as a catalyzed halosilane reaction, Hunnicutt and Harris do not teach one of ordinary skill in the art how to produce dual zone materials by means of such reaction mechanisms.

And yet, it is known to be desirable to produce dual zone porous materials having silyl groups of one type predominantly on the external surface and silyl groups of another type predominantly on the internal surface in order to provide on the external and internal surfaces differentially selective adsorbents, for example, for specific chromatographic and catalytic applications. It would also be desirable to do so with halosilane reactants which are relatively inexpensive and readily available. To date, however, it has not been possible to use halosilane reactants for this purpose.

Accordingly, the need remains for a method for halosilylation of predominantly the external surfaces of a porous hydroxyl-bearing support in the production of dual zone porous materials.

SUMMARY OF THE INVENTION

The present invention meets that need by providing a method for production of dual zone materials by use of catalyzed halosilanes. The preferred halosilanes used in the present invention have first silyl groups which, following the catalyzed silylation, will form first silyl groups predominantly on the external surfaces of a porous support. Thus the preferred halosalines bear at least one organic or organofunctional group, such as perfluorobutylethylenedimethylsilyl, chloropropylsilyl, $SiC_3H_6O(CH_2CH_2O)_aR$ wherein "a" is 0–10 and R is alkyl, aryl or acetyl and

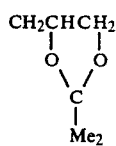

wherein Me is methyl. Preferred are silyl groups having the formula $Me_{3-m}C_2H_4C_nX_{2n+1}$, wherein X is a halogen, ni is 1 or more, Me is methyl, and me is 1–3.

The halosilane also has a one or more leaving groups "L" attached to the silicon, at least one of the leaving groups being a non-fluorine halogen group, i.e., a chloride, bromide or iodide, which when catalyzed reacts with the hydroxyl groups on the external surfaces of the porous support. Mixed leaving groups in which at least one is non-fluorine halogen and the others are slow leaving groups such as alkoxy or acetoxy are also leaving groups such as alkoxy or acetoxy are also suitable.

Thus, the preferred halosilane has the formula $L_mMe_{3-m}SiC_2H_4C_nX_{2n+1}$, wherein L is a non-fluorine halogen, Me is methyl, X is a halogen which may be the same as or different than L, ni is 1 or more, and m is 1–3. The halosilane may be applied in a solvent based mixture.

The halosilane mixture is added to a porous support suspension formed by mixing the porous support, such as a porous metalloid oxide, a porous metallic oxide, or mixtures thereof (preferably in particulate form, and most preferably particulate silica) with a solvent. The preferred solvent is an aprotic solvent which will not solvolyze the halosilane. Most preferred are non-polar solvents such as hexane, octane, decane, toluene, or mixtures thereof since such non-polar solvents will not retard the reaction rate due to their minimal interaction with the surface reactive sites. The porous support suspension also preferably contains the catalyst. The catalyst is a lewis base catalyst, preferably a basic amine such as pyridine, imidazole or ammonia. Nucleophilic agents known to strongly promote silane solvolysis such as hexamethylphosphoramide or dimethylsulfoxide (DMSO) are also effective.

As a result of contacting the hydroxyl bearing porous support suspension containing a catalyst with the halosilane first silyl groups are formed predominantly on the external surfaces of the porous support. This alone is sufficient to create a dual zone material if silica is used as the porous support and to the extent that silanol groups remain unreacted in the internal zone. Preferably, however, the porous support is subsequently contacted with a second silane having second silyl groups (different from those of the first silyl groups). That silane should be one capable of diffusing into the interior of the porous support and forming covalent bonds by reacting with the hydroxyl groups on the porous support to form second silyl groups on the internal surfaces of the porous support.

Preferred is a second silane having the formula $R_{4-e}SiX_e$, wherein R is independently selected from hydrogen, alkyl groups having 1 to 20 carbon atoms, phenyl, vinyl and allyl; X is a hydrolyzable radical selected from chlorine, alkoxy having 1 to 4 carbon atoms, acetoxy, amine and amido radicals; and e has a value of 1, 2 or 3. Other organofunctional silanes may also be used. Most preferred is uncatalyzed trimethylchlorosilane.

When a second silane having second silyls is subsequently brought into contact with the porous support, it, then, reacts predominantly with the hydroxyl groups on the internal surfaces of the porous support. This is because the majority of the hydroxyl groups on the external surfaces have already been consumed by the catalyzed halosilylation. While some reaction with hydroxyl groups which remain on the external surfaces may take place, the catalyzed halosilylation route offers a good quality dual zone material in that the external zone contains predominantly first silyl groups while the internal zone contains predominantly first silyl groups .

Actually, the amount of surface area of the porous support which is considered to be in the external zone versus the amount considered to be in the internal zone may vary. Preferred for purposes of this invention is the situation where the internal zone approximately comprises the internal 90 percent of the surface area and the external zone approximately comprises the external 10 percent of the surface area of the porous material. Use of a larger amount of halosaline will result in a greater degree of penetration into the interior of the porous support, will cause reaction with a greater number of hydroxyl groups on the surfaces of the porous support, and will create a larger external zone occupying a greater percentage of the surface are of the porous support. Thus, the external zone may range from 0.5% to 50% of the surface area and the internal zone may range from 50–99.5% of the surface area.

In any event, it is possible to control the degree of catalyzed halosilylation so that the size of the external zone is controlled. This enables one to produce dual zone materials having varying degrees of capacity for separation, such as for use as packing materials in liquid chromatography, or otherwise.

Accordingly, it is an object of the present invention to provide an improved method for production of dual zone porous materials by use of catalyzed halosilylation and to provide dual zone materials produced by that method. Other objects and advantages of the invention will become apparent from the following detailed description and the appended claims.

DETAILED DESCRIPTION OF THE PREFERRED EMBODIMENTS

The porous materials found useful in this invention are those materials which are porous solids having hydroxyl groups on their surfaces. Such materials for example are silica, silica gel, alumina, stannia, titania, zirconia, and the like. Also, these materials can be porous glass, porous ceramic or plastic as long as the material has, or will form, hydroxyl groups on its surface.

The form of the porous material is not overly critical. Particulate porous materials, as well as filaments, slabs, discs, blocks, spheres, films and other such forms can be used in this invention. Also contemplated within the scope of this invention is the treatment of particulate materials by the process of this invention, and subsequent forming of the treated particulate materials into slabs, discs, blocks, spheres, films, membranes, sheets, and the like.

Preferred for this invention are the porous metalloid oxides, metallic oxides and mixtures thereof such as silica, alumina, zirconia and titania in all of their related forms. Most preferred are particulate silicas which may vary in pore diameter from 50 to 2000 micro-meters, for example.

As mentioned, the first step in the production of the dual zone porous material of the present invention is forming a suspension of the porous support in a solvent. The solvent is preferably an aprotic solvent and most preferably a non-polar solvent, for example, hexane, octane, decane, toluene or mixtures thereof. Preferably, porous silica particles having a particle size of from 3 to 1000 micro-meters are mixed with the solvent in the amount of 0.1% to 40w/v%.

As also mentioned the lewis base catalyst may be added at this stage. The catalyst may be an amine like pyridine or ammonia; although, amidazole is the preferred catalyst. Nucleophilic agents that are known to form complexes with halosilane under some conditions, such as hexamethylphosphoramide, as well as others that are known to strongly promote silane solvolysis, such as dimethylsulfoxide, are also useable.

The amount of catalyst to be used must be at least 0.05 molecules/nM$^2$ of silica surface. The preferred amount of catalyst used is 0.2 to 4.8 nM$^2$.

To the porous support suspension there is next added a halosilane, which is preferably in a solvent based mixture, preferably using the same solvent as that used in the porous mixture suspension. The halosilane is one having first silyl groups. The preferred halosilane has the formula $L_mMe_{3-m}SiC_2H_4C_nX_{2n+1}$, wherein L is a non-fluorine halogen, Me is methyl, X is a halogen which may be the same as or different than L, n is 1 or more. and m is 1-3. Most preferred is $C_4F_9C_2H_4SiMe_2Cl$, i.e. fluoroaklylsilane containing $C_4H_9$: although, $CF_3$, $C_2F_5$, $C_3F_7$, etc. could also be used.

Fluroalkylsilanes are most preferred in that they can be used to produce a dual zone porous material having fluoroalkylsilyl groups in the external zone. The fluoroalkylsilyl groups serve as a lipophobic phase which is less adsorptive to proteinaceous substances when the dual zone porous material is used as a reverse phase packing material for high-pressure liquid chromatographic blood serum analysis as disclosed in copending application Ser. No. 063,576, filed June 17, 1987, the disclosure of which is hereby incorporated by reference.

The halosilane may be used in a amount varying from 0.01 to 2.0 m/nM$^2$, and preferably the porous support is contacted within 0.2 m/nN$^2$ of halosilane, i.e. 0.2 molecules of halosilane per square nanometer of surface area of the porous support.

The catalyzed halosilylation can be carried out in a period of time of from 1 minute to 24 hours. Generally, for purposes of this invention, it is preferred to carry out the catalyzed halosilylation over about a 30 minute to 6 hour time period to ensure that the external surface of the porous material is uniformly treated.

The temperature at which the catalyzed halosilylation is carried out is not narrowly critical and can range from 0° C. to 400° C. Preferred is a room temperature to 200° C. reaction mixture temperature.

Generally, the external zone can be the exterior 0.5% to 50% of the surface area of the porous support. However, there are often minor differences between the external and the average surface composition due to random scatter in analytical results. Furthermore, real differences between two compositions must be large enough to significantly affect properties of the material. In view of these considerations, meaningful dual zone character is attained only when either of the following conditions are met:

$$\frac{\Gamma_1(E)}{\Gamma_1(A)} \geq \begin{array}{l} 1.5, \Gamma_1(E) \geq 0.3 \text{ molecules/nM}^2 \\ \text{and } \Gamma_2(A) \geq 0.1 \text{ molecules/nM}^2 \end{array} \quad (a)$$

$$\frac{\Gamma_1(E)}{\Gamma_1(A)} \geq \begin{array}{l} 1.5, \Gamma_1(E) \geq 15\% \text{ of saturation of} \\ \text{the surface of the porous material; and} \\ \Gamma_2(A) \geq 5\% \text{ of saturation of the} \\ \text{surface of the porous material} \end{array} \quad (b)$$

wherein $\Gamma(E)$ is the external surface density in Molecules/nM$^2$ as inferred by Electron Spectroscopy Chemical Analysis, and wherein $\Gamma_1(A)$ and $\Gamma_2(A)$ are like measurements of average surface density as measured by bulk analysis, and wherein subscripts 1 and 2 refer to the groups immobilized in reaction first with the catalyzed halosilane and, then, with the second silane respectively.

Concentration is expressed in appropriate units such as molecules per square nanometers (m/nM$^2$).

$$\Gamma_1(A) = \frac{6 X_1}{10 S} 10^6$$

$$\Gamma_1(E) = \frac{R_1(E)\Gamma^\circ_1(A)}{R^\circ_1(A)}$$

$$R_1(E) = A_j/A_r$$

where $X_1$ is the amount of some group (labeled 1) as measured in moles per gram of silica by bulk elemental analysis, S is the specific surface are expressed in square meters per gram of silica and $R_1(E)$ is the ESCA-measured ratio of the surface atomic composition of element j, $A_j$, to that of element r, $A_r$. Element j is chosen to be unique to gfroup 1, and element r is chosen to come primarily from the porous substrate. Silicon was chosen as the reference element, r, since the contribution to $A_{Si}$ by the immobilized silane is relatively small. The analogous quantities, $\Gamma^\circ_1(A)$ and $R^\circ_1(A)$, are found by measurements on a silica possessing immobilized group #1 that does not have a compositional gradient. Such materials are easily prepared by exhaustive treatment with a single silylating agent.

Also included within the scope of this invention are the compositions which are intermediates. These compositions consists of a porous material having reacted to its exterior surface, immobilized silicon containing groups, and whose porous interior surface contains hydroxyls. The supra quantitative conditions (a) and (b)

are modified in the intermediates by dropping the requirements that $\Gamma_2 \geq 0.1$ or 5% of saturation.

These intermediates are useful products for the method disclosed supra for providing dual zone materials using reactive silanes to treat the interior pore surfaces.

Thus, while with a silica porous support it is possible to consider the unreacted silanols provided naturally on the internal surfaces as an internal zone, preferably second silyl groups are formed by contacting the porous support having first silyl groups first type predominantly on the external surfaces with a silane which has second silyl groups and which is capable of diffusing into the interior of the porous support.

The object of this preferred step is to permit the diffusion of the second silane into the pores of the porous support and to allow reaction of this silane with the hydroxyl groups that are covalently bonded to the internal surfaces. If water has been added during this reaction step, it may actually be the silanol-bearing hydrolysis product of the silane which reacts with the internal zone hydroxyl groups. Since the accessible external zone hydroxyls of the porous material have been effectively removed by the catalyzed halosilylation the second silane does not have available to it accessible reactive sites on the external surfaces of the porous support. Thus the second silane has only the hydroxyls remaining on the internal surfaces of the porous support available for reaction.

Therefore, this step must be carried out for a sufficient period of time to allow for the diffusion of the second silane having second silyl groups into the pores and reaction of the second silane with the internal zone hydroxyl groups therein (or hydrolysis of the silane and then diffusion of the hydrolyzate into the pore to react).

This step can be carried out for a period of time of from several minutes to several hours. Preferred for this invention is a reaction time for this step of from 10 minutes to 24 hours. Most preferred is a time of 1 to 6 hours.

The temperature at which this step is carried out is not narrowly critical. As one would expect, increased temperatures enhance the rate of reaction. Increasing the temperature does not appear to promote too many undesirable side reactions. Thus, the temperature used in this step can range from 0° C. to 400° C. Most preferred is the reflux temperature of the reaction at about 70° C. to 120°C.

The amount of second silane having second silyl groups useful in this invention depends on how many of the surface hydroxyls of the pore interior one wishes to treat. An excess of the second silane may be used as the silane does not displace any of the external surface groups obtained by the catalyzed halosilylation.

The reactive silanes useful in this step are those kinds of silanes which are recognized as conventional silylation reagents. Thus, the second silane may be any of the reactive silanes used in step III of parent application Ser. No. 154,754, filed Feb. 11, 1988. Preferred as a second silane are silanes such as those having the general formula $R_{4-e} SiX_e$ wherein R is independently selected from hydrogen, alkyl groups having 1 to 20 carbon atoms, phenyl, vinyl and allyl; X is a hydrolyzable radical selected from chlorine, alkoxy having 1 to 4 carbon atoms, acetoxy, amine and amido radicals; and e has a value of 1, 2 or 3. Other organofunctional silanes may also be used.

Specific silanes which are useful herein include: trimethylchlorosilane; dimethyldichlorosilane; hexamethyldisilazane; N,N'-bis(trimethylsilyl)urea; N-trimethylsilyldiethylamine; N-trimethylsilylimidazole; N,O-bis(trimethylsilyl)acetamide; N,O-bis(trimethylsilyl)trifluoroacetamide); N-methyl-N-trimethylsilyltrifluoroacetamide; t-butyldimethylsilylimidazole; N-trimethylsilylacetamide; N-trimethylsilylpiperidine; hexamethyldisilthiane; O-trimethylsilylacetate; O-trimethylsilyltrifluoroacetate; N-trimethylsilyldimethylamine; N-trimethylsilylmorpholine; N-trimethylsilylpyrrolidine; and N-trimethylsilylacetanilide.

Yet another aspect of this invention is the use in this step of organofunctional silanes to silylate the porous material. Such silanes useful in this invention include, for example.
(alpha-methacryloxypropyl)trimethoxysilane;
(4-aminopropyl)triethoxysilane;
Lgamma-(beta-aminoethylamino)-propylltrimethoxylilane;
Lbeta-(3,4-epoxycyclohexyl)-ethylltrimethoxysilane;
(gamma-glycidoxypropyl)trimethoxysilane;
(gamma-chloropropyl) trimethoxylsilane;
$CH_2=CHC_6H_4CH_2NH(CH_2)_2NH(CH_2)_3Si(OCH_3)_3$"·HCl;
$(CH_3O)_3Si(CH_2)_3N(CH_3)_2C_{18}H_{37}Cl^-$;
$(CH_3)_3Si(CH_2)_3N(CH_3)_2C_{12}H_{25}Cl^-$;
$(CH_3O)_3Si(CH_2)_3NCH_3(C_{12}H_{25})_2Cl^-$;

$(CH_3O)_3Si(CH_2)_3$ — [8-hydroxyquinolinyl group];

$(CH_3O)_3Si(CH_2)_9CH_3$; $(CH_3O)_3Si(CH_2)_{19}CH_3$
and the like. These silanes will impart a variety of useful chemical properties to the internal zone which can be usefully combined with valuable transport properties of the external zone groups.

For example, the external groups may enhance the ion selectivity of chelating groups covalently bonded to the interior surface.

When it is determined that the reaction in this step is essentially finished, the product is typically isolated from the reaction mixture. Thus, the final step of this process is the isolation of such products from the reaction mixture. This can be accomplished in a number of ways. For example, the liquid can be decanted, the porous material washed and the liquid decanted, successively, or the reaction mixture can be filtered to remove the liquid from the solid product. The final product can be used in this form or it can be dried. If the final product is other than particulate in form it can be used as is or it can be further shaped and formed without losing beneficial properties. If the material is in a particulate form it can be used as is or it can be compressed, sintered, or otherwise formed.

So that those skilled in the art may appreciate and understand the invention described herein, the following examples are offered for illustration purposes only. The examples should not be construed as limiting the invention as defined in the claims.

Six examples of this new route to dual zone materials are given. Three examples of the failure of "uncatalyzed" chlorosilanes to afford dual zone materials are given. Two different porous silicas were used: (1) Baker

3405-1 chromatographic grade, 60-200 mesh, 60° A pore diameter, 300 $M^2/g$ specific surface area and (2) Amicon #84224, 20 micrometer particles, 250° A pore diameter, 320 $M^2/g$ specific surface area.

EXAMPLE 1

Preparation of $C_4F_9C_2H_4Me_2Si/SiOH$ Dual Zone Material 1.00 g ($1.2 \times 10^{-3}$ eq. OH @2.4 $OH/nM^2$) of dried Baker silica (vacuum oven/180° C./16 hours) and 1000 cc octane along with 0.017 g ($2.5 \times 10^{-4}$ eq. or 0.5 molecules/nanometer $m/nM^2$) of imidazole were added to a 500 cc indented round-bottomed flask equipped with an air-motor driven paddle, an addition funnel, and a condenser topped with a $N_2$ sweep. This mixture was stirred 10 minutes and heated to solvent reflux at 125° C. to produce a silica suspension. Then a freshly prepared solution of 0.034 g ($1.0 \times 10^{-4}$ eq. or 0.20 $m/nM^2$) of $C_4F_9C_2H_4Me_2SiCl$ (PFBCl) in 30 cc octane was added over 15 minutes with vigorous stirring. The reaction mixture was then refluxed 45 minutes without stirring. After cooling, the silica was isolated by filtration and washed three times with octane and three times with diethyl ether. Finally, the treated silica was dried in a vacuum oven at 80° C. for 3 hours prior to analysis or further work.

Bulk analysis gave a value of 1.04 wt % F, corresponding to an average surface concentration of 0.12 $m/nM^2$ of PFB. External surface analysis by ESCA gave a value of 0.54 F/Si, corresponding to a concentration at the external surface of 0.75 $m/nM^2$ of PFB. Thus this material meets modified condition (a) for a dual zone material.

Bulk analytical values were converted to average surface concentrations using a value of 300 $M^2/g$ for the specific surface area of the silica. Calculation of the external surface concentration was made using reference values of 1.11 F/Si (ESCA) and 10.74 wt. % F. These reference values were obtained for Baker silica that had been thoroughly treated with an excess of the N-methylacetamide derivative of the above chlorosilane to ensure that no compositional gradient was present.

EXAMPLE 2

Preparation of a PFB/TMS Dual Zone Material 0.35 g of the silica treated as in Example 1 and 100 cc octane were added to a 200 cc round-bottomed flask equipped with a condenser topped with a $N_2$ sweep. The slurry was swirled 1 minute and 0.13 cc ($8.4 \times 10^{-4}$ eq. or twice eq. OH) of N-methyl-N-trimethylsilylacetamide (TMSA) was added and the flask was heated to reflux for 2 hours. After cooling, the treated silica was isolated, washed, and dried as above.

Bulk analysis gave values of 1.04 wt % F and 4.26 wt % C, corresponding to average surface concentrations of 0.13 $m/nM^2$ of PFB and 2.25 $m/nM^2$ of TMS (trimethylsilyl). External surface analysis by ESCA gave a value of 0.49 F/Si, corresponding to 0.69 $m/nM^2$ of PFB. Thus this material meets condition (a) for a dual zone material.

EXAMPLE 3

Preparation of PFB/SiOH Dual Zone Material

The same procedure as in example 1 was used with one exception: 20.3 mR of pyridine (0.5 $m/nM^2$) replaced the imidazole.

Bulk analysis gave a value of 1.38 wt % F, corresponding to an average surface concentration of 0.17 $m/nM^2$ of PFB. External surface analysis gave a value of 0.23 F/Si, corresponding to 0.32 $m/nM^2$. Thus the material met modified condition (a) for a dual zone material.

EXAMPLE 4

Failure to Prepare PFB/SiOH Dual Zone Material

The same procedure as in example 1 was used but the imidazole catalyst was omitted.

Bulk analysis gave a value of 0.29 wt % F, corresponding to an average surface concentration of 0.035 $m/nM^2$ of PFB, corresponding to 0.08 $m/nM^2$. Thus, although this material met none of the conditions or modified conditions (a) or (b) and should not be considered a dual zone material.

EXAMPLE 5

Preparation of PFB/SiOH Dual Zone Material

The same procedure as in example 1 was used with the following exceptions: 1.00 g ($1.3 \times 10^{-3}$ eq. OH @2.4 $OH/nM^2$) of similarly dried Amicon silica was used which had been twice-refluxed in dilute nitric acid followed by exhaustive washings with distilled water to remove initial catalytic activity of this particular silica. (The activity was relative to disiloxane formation from trimethylsilanol, and may have had no effect on surface silylation kinetics). 0.018 g ($2.7 \times 10^{-4}$ eq. or 0.5 $M/nM^2$) of imidazole and 0.036 g ($1.1 \times 10^{-4}$ eq. or 0.2 $n/nM^2$) of PFBCl was used.

Bulk analysis gave a value of 1.58 wt % F, corresponding to 0.18 $m/nM^2$ average surface concentration of PFB. External surface analysis by ESCA gave a value of 0.39 F/Si, corresponding to 0.60 $m/nm^2$ of PFB. Thus this material meets modified condition (a) for a dual zone material.

Bulk analytical values were converted to average surface concentrations using a value of 320 $m^2/g$ for the specific surface area of this particular silica. Calculation of the external surface concentration was made using reference values of 1.21 F/Si (ESCA) and 12.86 wt % F. These reference values were obtained for Amicon silica that had been thoroughly treated with excess of N-methylacetamide derivative of the above chlorosilane to ensure that no compositional gradient was present. Conversions in examples 6 and 7 were done in the same way.

EXAMPLE 6

Preparation of PFB/TMS Dual Zone Material 0.35 g of the above treated silica of example 5 was treated with 0.14 cc of TMSA ($8.9 \times 10^{-4}$ eq. or twice eq. OH), isolated, washed, and dried as in the procedure given for example 2.

Bulk analysis gave values of 1.47 wt % F and 4.69 wt % C, corresponding to average surface concentrations of 0.17 $m/nM^2$ of PFB and 2.28 $n/nM^2$ of TMS. External surface analysis by ESCA gave a value of 0.37 F/Si, corresponding to 0.56 m/nM² of PFB. Thus the material met modified condition (a) for a dual zone material.

EXAMPLE 7

Failure to Prepare a PFB/SiOH Dual Zone Material

The procedure of example 5 was repeated in the absence of an intentionally added catalyst.

Bulk analysis gave a value of 0.56 wy % F, corresponding to an average surface concentration of 0.06 m/nM² of PFB. External surface analysis by ESCA gave a value of 0.07 F/Si, corresponding to 0.11 m/nM² PFB. Thus the material met none of the conditions or modified conditions (a) and (b) and should not be considered a dual zone material.

EXAMPLE 8

Preparation of a CF₃CH₂CH₂Me₂SI/TMS Dual Zone Material 1.00 g (1.2 $10^{-3}$ eq. OH @ 2.4 OH/nM²) of Baker silica dried at 180° C./16 hours under vacuum, and 100 cc of hexane along with 0.017 g ($2.5 \times 10^{-4}$ eq. or 0.5 m/nM²) of imidazole were added to a 500 cc indented round-bottomed flask equipped with an air motor-driven paddle, an additional funnel, and a condenser topped with a N₂ sweep. This mixture was stirred 10 minutes and heated to reflux at 69° C. During reflux, a freshly prepared solution of 16.9 ul (or 0.2 m/nM²) of CF₃CH₂CH₂Me₂SiCl—denoted TFSCl—in 15 cc of hexane was added over 5minutes and subsequently stirred for 1 minute. Then 0.18 cc (2.8 m/nM²) of TMSCl in 15 cc of hexane was added to the mixture and refluxed for two hours without stirring. Solids were removed from the cooled mixture via filtration, washed twice with hexane, 50/50 acetonitrile/water to remove salts, acetonitrile, and finally diethyl ether. Treated silica was vacuum-oven dried for 3 hours @ 80° C. and submitted for analysis.

Bulk analysis gave values of 0.30 wt % F and 2.66 wt % C, corresponding to average surface concentrations of 0.11 m/nM² of TFS and 1.38 m/nM² of TMS. External surface analysis by ESCA gave a value of 0.161 F/Si, corresponding to 0.64 m/nM² of TFS. Thus this material met condition (a) for a dual zone material.

Bulk analytical values were converted to average surface concentrations using a value of 300 M²/g for the specific surface area of the Baker silica. Calculation of the external surface concentration was made using reference values of 0.412 F/Si (ESCA) and 4.10 wt % F. These reference values were obtained for Baker silica which had been thoroughly treated three times with an excess of TFSA at room temperature to ensure that no compositional gradient was present. Conversion in example 9 was done in this same way.

EXAMPLE 9

Failure to Prepare a TFS/TMS Dual Zone Material

The attempted preparation followed the procedure given in example 8, with the exception that no catalyst (imidazole) was added.

Bulk analysis gave 0.11 wt % F and 0.60 wt % C, corresponding to average surface concentrations of 0.039 m/nM² of TFS and 0.27 m/nM² of TMS. External surface analysis by ESCA gave a value of 0.016 F/Si, corresponding to 0.064 m/nM² of TFS. Thus this material failed to meet conditions or modified conditions (a) or (b) and should not be considered to be a dual zone material.

Having described the invention in detail and by reference to the preferred embodiment thereof, it will be apparent that modifications and variations are possible without departing from the scope of the invention defined in the appended claims.

What is claimed is:

1. A method of silylating a porous material having an external zone which comprises the external surfaces of the porous material and having an internal zone which comprises the internal surfaces of the porous material, comprising:
   (a) providing a hydroxyl-bearing porous support selected from the group consisting of porous metalloid oxides, porous metallic oxides, and mixtures thereof,
   (b) forming a porous support suspension by mixing said porous support with a solvent, said suspension also containing a lewis base catalyst,
   (c) adding to said suspension a halosilane in an amount which does not exceed 2.0 molecules per square nanometer of surface area of the porous support in said suspension and which is catalyzed by said catalyst so as to form silyl groups predominantly on the external surfaces of said porous support,
   (d) providing silyl groups predominantly on the internal surfaces of said porous support which are different from the silyl groups formed predominately on said external surfaces, and
   (e) subsequently isolating the so-treated porous support and thereby providing a silylated porous material.

2. The method of claim 1 wherein said porous support is particulate silica.

3. The method of claim 2 wherein said solvent is an aprotic solvent.

4. The method of claim 2 wherein said solvent is a non-polar solvent.

5. The method of claim 2 wherein said solvent is selected from the group consisting of hexane, octane, decane, toluene and mixtures thereof.

6. The method of claim 2 wherein said catalyst is a basic amine.

7. The method of claim 6 wherein said catalyst is selected from the group consisting of imidazole, pyridine and ammonia.

8. The method of claim 2 wherein said halosilane is added to said suspension by means of a solvent-based mixture.

9. The method of claim 8 wherein the solvent in said solvent-based mixture is an aprotic solvent.

10. The method of claim 8 wherein the solvent in said solvent-based mixture is selected from the group consisting of hexane, octane, decane, toluene, and mixtures thereof.

11. The method of claim 1 in which the rate of addition of said halosilane does not exceed 0.2 molecules per minute per square nanometer of porous support in said suspension.

12. The method of claim 1 in which the amount of silyl groups formed predominantly on the external surfaces of said porous support is less than 0.80 molecules per square nanometer of porous support as measured by bulk analysis.

13. The method of claim 1 wherein said silyl groups formed predominantly on said external surfaces are selected from the group consisting of perfluorobutyle-thylenedimethylsilyl, chloropropylsilyl, $SiC_3H_6O(CH_2CH_2O)_aR$ wherein a is 0–10 and R is alkyl, aryl or acetyl, and

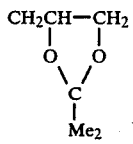

wherein Me is methyl.

14. The method of claim 1 wherein said halosilane has the formula $L_mMe_3SiC_2H_4C_nX_{2n+1}$ wherein L is a non-fluorine halogen, Me is methyl, X is a halogen, n is 1 or more, and m is 1–3.

15. The method of claim 1 wherein said silyl groups provided predominantly on said internal surfaces are formed by contacting the porous support having silyl groups formed predominantly on the external surfaces with a silane different from said halosilane and which is capable of diffusing into the interior of said porous support and forming covalent bonds by reacting with the hydroxl groups on said porous support, and maintaining the contact between said porous support and said silane for a sufficient period of time to allow formation of silyl groups predominantly on the internal surfaces of said porous support which are different from the silyl groups formed predominantly on said external surfaces.

16. The method of claim 14 wherein said silane has the formula $R_{4-e}SiX_e$, wherein R is independently selected from hydrogen, alkyl groups having 1 to 20 carbon atoms, phenyl, vinyl and allyl, X is a hydrolyzable radical selected from chlorine, alkoxy having 1 to 4 carbon atoms, acetoxy, amine and amido radicals, and e is 1, 2 or 3.

17. The method of claim 15 wherein said silane is trimethylchlorosilane.

18. The method of claim 1 wherein said silylated porous material has conditions selected from one of the following:

(a) $\dfrac{\Gamma_1(E)}{\Gamma_1(A)} \geq$ 1.5, $\Gamma_1(E) \geq$ 0.3 molecules per square nanometer, and $\Gamma_2(A) >$ 0.1 molecules per square nanometer or (b) $\dfrac{\Gamma_1(E)}{\Gamma_1(A)} \geq$ 1.5, $\Gamma_1(E) \geq$ 15% of saturation of the surface of the porous material, and $\Gamma_2(A) >$ 5% of saturation of the surface of the porous material, wherein $\Gamma_1$ (E) is the external surface density in Molecules per square nanometer of the reaction product of step (C) as inferred by Electron Spectroscopy Chemical Analysis, and wherein $\Gamma_1$ (A) and $\Gamma_2$ (A) are like measurements of average surface density as measured by bulk analysis and wherein subscripts 1 and 2 refer to said silyl groups formed predominately on said external surfaces and said silyl groups provided predominately on said internal surfaces, respectively.

19. A method of silylating a porous material having an external zone of external surfaces ranging from 0.5% to 50% of the surface area of the porous material and having an internal zone of internal surfaces ranging from 50–99.5% of the surface area of the porous material, comprising:

(a) providing a hydroxyl-bearing porous support selected from the group consisting of porous metalloid oxides, porous metallic oxides, and mixtures thereof, (b) forming a porous support suspension by mixing said porous support with a solvent, said suspension also containing a lewis base catalyst, (c) adding to said suspension a halosilane in an amount which does not exceed 2.0 molecules per square nanometer of the porous support in said suspension and which is catalyzed by said catalyst so as to form predominantly on the external surfaces of said porous support silyl groups selected from the group consisting of perfluorobutyle-thylenedimethysilyl, chloropropylsilyl, $SiC_3H_6O(CH_2CH_2O)_aR$ wherein a is 0–10 and R is alkyl, aryl or acetyl, and

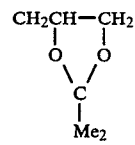

where Me is methyl, (d) providing silyl groups predominantly on the internal surfaces of said porous support which are different from the silyl groups formed predominantly on said external surfaces by contacting said porous support having silyl groups formed predominantly on the external surfaces with a silane having the formula $R_{4-e}SiX_e$, wherein R is independently selected from hydrogen, alkyl groups having 1 to 20 carbon atoms, phenyl, vinyl and allyl, X is a hydrolyzable radical selected from chlorine, alkoxy having 1 to 4 carbon atoms, acetoxy, amine and amido radicals, and e is 1, 2 or 3, and (e) subsequently isolating the so-treated porous support and thereby providing a silylated porous material.

20. The method of claim 19 wherein said porous support is particulate silica, said solvent is selected from the group consisting of hexane, octane, decane, toluene and mixtures thereof, and said catalyst is selected from the group consisting of imidazole, pyridine and ammonia.

21. A method of preparing an intermediate useful in the preparation of silylated porous materials having an external zone which comprises the external surfaces of the porous material with silyl groups formed predominantly thereon and having an internal zone which comprises the internal surfaces of the porous material with silyl groups provided predominantly thereon which are different from the silyl groups formed predominantly on said external surfaces, comprising:

(a) providing a hydroxyl-bearing porous support selected from the group consisting of porous metalloid oxides, porous metallic oxides, and mixtures thereof, (b) form a porous support suspension by mixing said porous support with a solvent, said suspension also containing a lewis base catalyst, (c) adding to said suspension a halosilane in an amount which does not exceed 2.0 molecules per square nanometer of surface area of the porous support in said suspension and which is catalyzed by said catalyst so as to form silyl groups predominantly on the external surfaces of said porous support, and (d) subsequently isolating the so-treated porous support and thereby providing said intermediate.

22. The method of claim 21 wherein said porous support is particulate silica.

23. The method of claim 22 wherein said solvent is an aprotic solvent.

24. The method of claim 22 wherein said solvent is a non-polar solvent.

25. The method of claim 24 wherein said solvent is selected from the group consisting of hexane, octane, decane, toluene and mixtures thereof.

26. The method of claim 22 wherein said catalyst is a basic amine.

27. The method of claim 26 wherein said catalyst is selected from the group consisting of imidazole, pyridine and ammonia.

28. The method of claim 22 wherein said halosilane is added to said suspension by means of a solvent-based mixture.

29. The method of claim 28 wherein the solvent in said solvent-based mixture is an aprotic solvent.

30. The method of claim 29 wherein the solvent in said solvent-based mixture is selected from the group consisting of hexane, octane, decane, toluene and mixtures thereof.

31. The method of claim 22 in which the rate of addition of said halosilane does not exceed 0.2 molecules per minute per square nanometer of silica in said suspension.

32. The method of claim 22 in which the amount of silyl groups formed predominantly on the external surfaces of said porous support is less than 0.80 molecules per square nanometer of silica as measured by bulk analysis.

33. The method of claim 21 wherein said silyl groups formed predominantly on said external surfaces are selected from the group consisting of prefluorobutylethylenedimethylsilyl, chloropropylsilyl, $SiC_3H_6O(CH_2CH_2O)_aR$ wherein a is 0–20 and R is alkyl, aryl or acetyl and

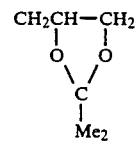

wherein Me is methyl.

34. The method of claim 21 wherein said halosilane has the formula $L_mMe_{3-m}SiC_2H_4C_nX_{2n+1}$ wherein L is a non-fluorine halogen, Me is methyl, X is a halogen, n is 1 or more, and m is 1–3.

* * * * *